United States Patent [19]

Stockton

[11] 4,217,699
[45] Aug. 19, 1980

[54] TERRESTRIAL MAGNETISM RESPONSIVE DEVICE AND METHOD FOR USING NORTH OR SOUTH SEEKING MAGNETS IN BOTH NORTH AND SOUTH HEADINGS

[76] Inventor: Raymond F. Stockton, 1780 Foothill Dr., Vista, Calif. 92083

[21] Appl. No.: 829,265

[22] Filed: Aug. 31, 1977

[51] Int. Cl.² .................... G01C 17/08; G01V 3/08
[52] U.S. Cl. .................................... 33/355 R; 33/352; 324/345
[58] Field of Search .............. 324/8, 259; 33/355, 33/352, 364

[56] References Cited

U.S. PATENT DOCUMENTS

| | | | |
|---|---|---|---|
| 1,746,627 | 2/1930 | Babbitt | 324/259 X |
| 2,493,779 | 1/1950 | Rubenstein | 324/259 |
| 3,423,672 | 1/1969 | Stockton | 324/8 |

*Primary Examiner*—William D. Martin, Jr.
*Attorney, Agent, or Firm*—Whann & McManigal

[57] ABSTRACT

A terrestrial magnetism responsive device adapted to use a north or south seeking magnet in both north and south headings, the device including a housing having a north or south seeking magnet therein, the magnet being suspended adjacent one pole by a sensitive spring to permit the magnet to be movable horizontally, when released, from a north pointing position or a south pointing position. The method includes the releasing of a north or south seeking magnet in the housing so that it is free to move easterly or westerly on the spring, moving the housing over the areas to be explored, and recording the east/west diversions of the magnet and the exact locations of the diversions.

9 Claims, 5 Drawing Figures

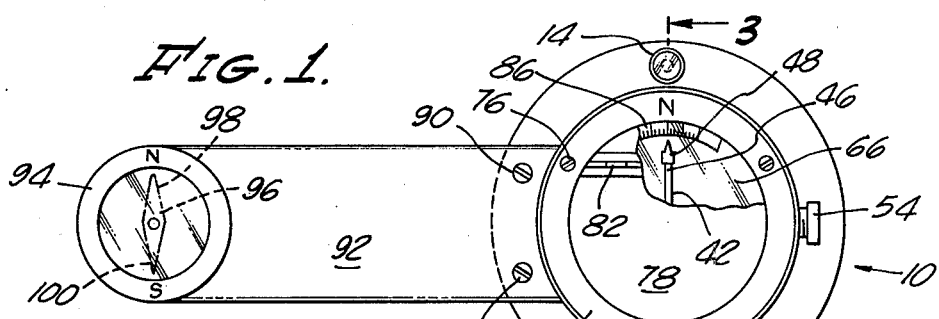
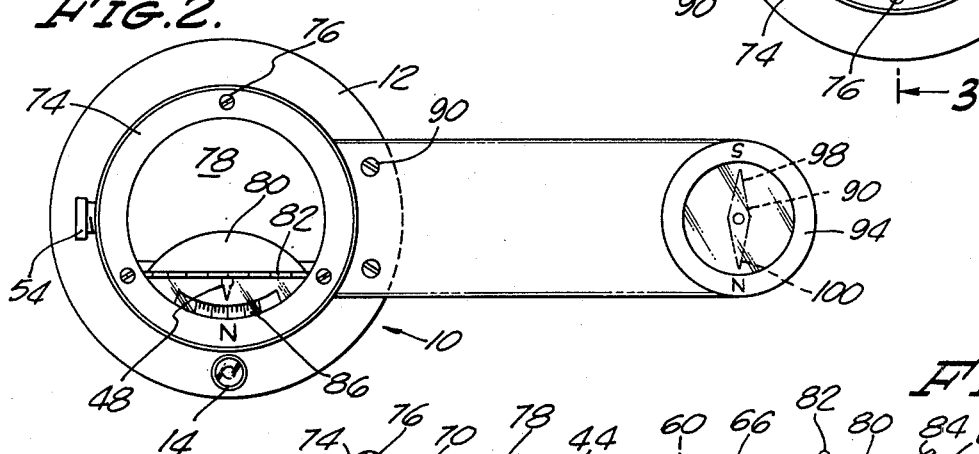
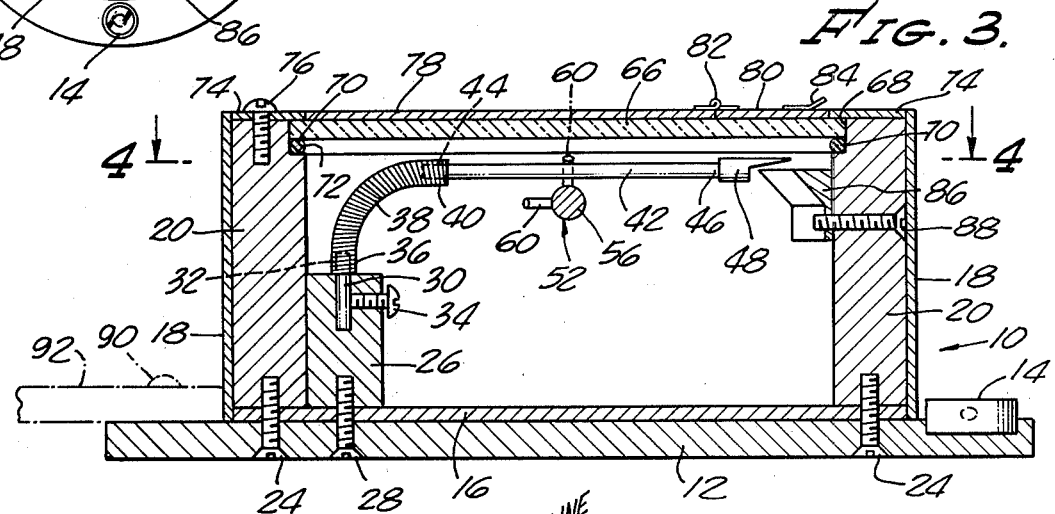
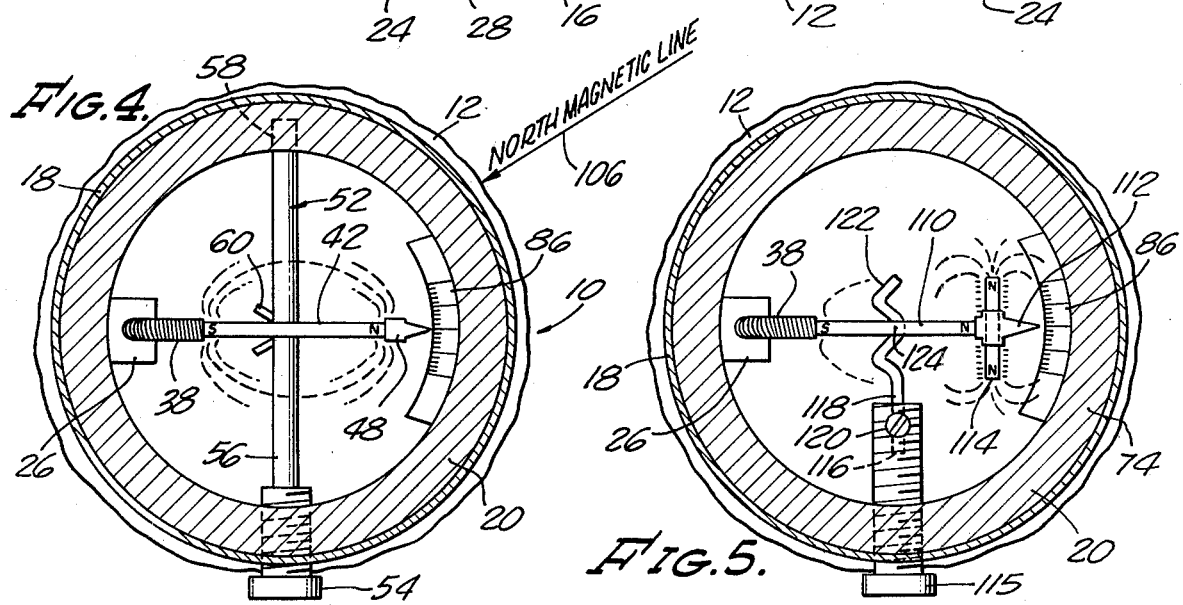

4,217,699

TERRESTRIAL MAGNETISM RESPONSIVE DEVICE AND METHOD FOR USING NORTH OR SOUTH SEEKING MAGNETS IN BOTH NORTH AND SOUTH HEADINGS

BACKGROUND OF THE INVENTION

Many earth formations give off radiations which are peculiar to the physical properties of the formations and considerable exploration is done with structures for measuring the radiated rays and local magnetic force fields produced by subsurface formations.

With a general knowledge of influencing physical properties, and with the measured magnetic variations it is possible to predict the probable geological structure of a subsurface in a given locale.

DESCRIPTION OF THE PRIOR ART

There are numerous structures adapted to respond to localized magnetic force fields. The closest prior art known to applicant are the structures shown in his patent entitled, Terrestrial Magnetism Responsive Device Including Fluid Supported Indicating Means for Investigating Subsurface Characteristics of the Earth, U.S. Pat. No. 3,423,672, issued Jan. 21, 1969, and his pending application entitled, Improvements in Terrestrial Magnetism Responsive Devices, Ser. No. 798,325, filed May 19, 1977.

SUMMARY OF THE INVENTION

According to the invention, it has been surprisingly found that local magnetic force fields produced by subsurface formations can be detected by working a south seeking magnet north and a north seeking magnet south in the northern hemisphere, the reverse being true in the southern hemisphere.

The foregoing discovery is unexpected in that the like poles oppose each other and unlike poles attract each other.

Further, considering that the earth itself is a large round magnet, with magnetic lines of force extending from its surface in all directions at any given point, and that its lines of force are greater in a line from north to south than in a line from east to west, the invention presents the opposite to what would be expected.

However, it should be noted that a north seeking end of a magnet working south has less pulling power on it than it would have if working in a northerly direction in the northern hemisphere. This lesser pulling power permits the magnet to swing, or rotate, more freely from side to side, permitting a wider range of readings on a scale so as to produce more efficiency in the operation.

When prospecting with terrestrial magnetism responsive devices, one is only concerned with the movement of the magnet from right or left of a given point on a scale. When moving from the given point to the right, for example, the explorer must follow that direction because the instrument has picked up an ambient field emanating from the earth's surface and this ambient field is what the explorer is trying to locate as it is coming from a formation in the earth that is capable of producing a stronger magnetic field than the surrounding material with which it is associated.

In the present invention the magnet is held in suspension by a wire coil spring at the south end, for example, and the north seeking end of the magnet is adapted to move, when released, from side to side through the magnetic meridian of the earth in balance with the magnetic fields thereof. The north seeking end may be worked both in the northerly and southerly direction. The same is true of a south seeking end.

This method of using like magnetic fields, opposing each other, that is, working the north seeking end of a magnet towards the south, effects a balance of the magnetic fields of the earth with the magnet to provide a more efficient and superior method and instrument than using magnetic fields to attract each other for the same purpose.

Accordingly, it is an object of the present invention to provide a terrestrial magnetism reponsive device adapted to use north or south seeking magnets in both north and south headings.

It is another object of the invention to provide a method for using north and south seeking magnets both in the north and south directions for finding areas of terrestrial formations having physical properties which set up local magnetic force fields.

It is still another object of the invention to provide a terrestrial magnetism responsive device, as described in the foregoing, that is simpler, less expensive and requires less maintenance than those of the prior art.

It is a further object of the invention to provide a device, as described in the preceding paragraph having a north or south seeking magnet which when directed in the direction opposite the seeking direction provides more power and more pull with respect to formations being searched.

It is another object of the invention to provide devices, as described in the preceding paragraphs, in which the magnets have greater freedom of movement toward foundations being explored than those magnets in the prior art devices.

It is still another object of the invention to provide a device, as described in the preceding paragraphs, in which the free end of a north or south seeking magnet is constructed so as to decrease the effectiveness on it of the magnetic field power of the respective north or south meridian by about 50%.

The effectiveness of the magnetic lines of force of the north or south meridian are so decreased on the magnet that they will be effectively in balance with the ambient fields of the earth so that the magnet will move in right or left directions in accordance with the influence of the ambient fields. A pointer on the free end of the magnet will record the movement on a scale.

Further objects and advantages of the invention may be brought out in the following part of the specification, wherein small details have been described for the competence of disclosure, without intending to limit the scope of the invention which is set forth in the appended claims.

BRIEF DESCRIPTION OF THE DRAWINGS

Referring to the accompanying drawings, which are for illustrative purposes:

FIG. 1 is a plan view of the invention illustrating north seeking magnet pointing in the northerly direction;

FIG. 2 is a plan view of the invention, illustrated in FIG. 1, in which a north seeking magnet is held in a fixed position to point in the southerly direction.

FIG. 3 is a cross-sectional view of the invention taken on the line 3—3 of FIG. 1;

FIG. 4 is a plan view partially in cross-section taken on the line 4—4 of FIG. 3; and FIG. 5 is a plan view of another embodiment of the invention.

DESCRIPTION OF THE PREFERRED EMBODIMENT

Referring again to the drawings, FIGS. 1-3, there is a generally cylindrical housing 10, supported on a bottom disc-shaped plate 12 having a centering-bubble leveling device 14, the level bubble being in the center when the plate 12 is held in a true horizontal position. The device 14 is positioned on the plate 12 to be in a true north direction from a north seeking magnet that is free to so point.

In abutment with the upper surface of the plate 12 is a cork insulation disc 16 forming an inner bottom of the housing 10 and providing insulation for temperature control. Extending upwardly from the plate 12, surrounding the insulation member 16, is a cylindrical cork insulation member 18 formed on a main cylindrical wall 20 of the housing. The cylindrical wall 20 is secured to the plate 12 and the insulation member 16 by means of screws 24.

In abutment with a portion of the inner surface of the wall 20 is a spring supporting member 26 secured to the plate 12 by means of a screw 28. The top end of the member 26 has a bore in which extends a pin 30, having its upper end 32 outwardly of the member 26. The pin 30 is secured in the supporting member by a screw 34.

Secured to the upper end 32 of the pin is a lower end 36 of a sensitive coil spring 38 and secured to the other end 40 of the spring is magnetic rod or bar 42 with its south pole 44 secured in the spring and its north seeking end 46 having a pointer 48 fixed thereon and adapted to point in the northerly direction when uninfluenced by magnetic forces except those along the north magnetic line.

The spring 38 effects a right angle so as to hold the magnet 42, when it is otherwise non-supported, in a horizontal position, free to be moved by magnetic forces on it. All parts of the housing except the magnet rod 42 are non-magnetic.

In FIGS. 3 and 4, a device, generally designated as 52 for holding the bar magnet 42 in the transporting position is shown. It is comprised of a screw 54 threadedly engaged in the wall 20 and having a rod 56 extending diametrically across the housing into a bore 58 in the other side of the housing wall. Rod 56 extends directly under magnet bar 42 and it has two members 60 forming a "V," shown in a horizontal nonengaging position in FIG. 4. When the screw 54 is rotated 90° to the right, the members 60 are moved to a vertical position to extend upwardly alongside the magnet 42 and to hold it against movement for transporting. The V-shaped members 60 are so spaced to receive the magnet easily to place it in the transporting position so that time can be saved during this part of the operation.

Directly above the magnet is a glass plate 66 fitted in enlarged diameter portion 68 of the wall 20 and under the glass is a sealing ring 70 fitted on a shoulder 72 at the bottom of the enlarged diameter portion 68. At the top of the wall 20 is a washer 74 which extends inwardly over the glass and above the sealing ring to hold the glass in a sealing relationship with the interior of the housing. The washer is secured in place by means of screws 76. Inwardly of the washer is a cork insulating disc 78 which provides insulation temperature control for the upper part of the housing. So that the pointer 48 can be seen, insulating member 78 has a segmental hinged portion 80 which may be lifted upwardly as shown in FIG. 2, on a piano-type hinge 82 by means of a handle 84, FIG. 3.

A scale 86 directly below the segmental portion 80 is secured to the wall 20 by means of a screw 88, FIG. 3. The scale is in the area of the true north point, marked N and to which the pointer 48 on a north seeking end of the magnet would point when uninfluenced by other magnetic forces.

Attached to the upper face of the plate 12 by means of screws 90 is a compass supporting and spacing plate 92 to which a compass 94 is attached and spaced sufficiently away from the magnet 46 so as to not be influenced by it. The compass has a needle 96 having a north seeking end 98 and a south pole 100, the pole 98 being adapted to point north at all times. In FIG. 2 the housing 10 is reversed to point southerly, for example, and the north seeking end 98 of the compass is shown to be pointing to the south on the compass but is actually pointing in the true northerly direction.

Using the device shown in FIGS. 1-4, where it is suspected that there might be formations having physical properties which will set up local magnetic force fields, the device is held in an exactly horizontal position as indicated by centering the bubble in the device 14. Shown in FIG. 4, before the magnet is released, the device is rotated so that the pointer will be at an angle from the north magnetic line 106. The effect of this is to decrease the influence of the magnetic north field power on the magnet 42 by about 50% and this decrease will tend to balance the forces, in the ambient fields being explored, with the magnetic forces of the north magnetic meridian. Then when the magnet is released, by rotating the screw 54, the bar will move to the left or right under the influence of the ambient forces being explored and they will cause the pointer to record the movement for measurement on the scale 86. When the pointer is moved from the position shown in FIG. 4, the diversions are noted and the exact location where the test is being made is also noted. This information is turned over to engineers for analysis and a determination of whether exploratory operations should be performed at this particular location.

Similarly, when the device 10 is rotated to point the northern position (N) to the south, the magnetic needle is rotated in its transporting position to be at an angle similar to that shown in FIG. 4 with respect to the north magnetic line, the true north/south always being shown by the compass 94. The operation moving in the southerly direction is the same as that as in the northerly direction. There is one difference, however, in that when the north seeking end of the magnet is being worked southerly, it has less pulling power on it than it has when working in the north direction. This actually permits the magnet to swing or rotate more freely from side to side to provide a wider range of readings on the scale and thereby produces more efficiency in regard to finding the local magnetic force fields.

As indicated above, when prospecting with the instrument, the operator's interest is in the movement of the pointer from right or left of a given point on a scale. When moving from that point to the right, for example, that direction indicated must be followed because the instrument has picked up an ambient field emanating from the earth's surface and one which is being attempted to be located, the field coming from a formation being capable of producing a stronger magnetic field than the surrounding material with which it is associated.

In FIG. 5 another embodiment of the invention is illustrated. Here a rod magnet 110 has its south pole supported in the spring 38 and its north seeking end directed toward the scale 86. A pointer 112 is secured on the north end of the magnet and has a bore at right angles thereto in which an unmagnetized soft iron bar 114 is inserted. The bar has its center at the end of the magnet 110 and has the same diameter. As the magnetic lines of force indicate, bar 114 is magnetized when it receives magnetic force from the magnet. The lines of force extend outwardly from the soft iron bar in all directions and set up a double-headed north seeking magnet with a wide north seeking field. If no other magnetic forces act upon it, it will settle on the north magnetic line.

The addition of the soft iron bar 114 serves to decrease the magnetic north power on the magnet 110 by about 50%. The decrease of the effect of the forces along the north magnetic meridian will cause the magnet to be balanced with the forces from ambient fields from the earth. This will result in permitting the magnetic fields of the soft iron bar to move in a direction left or right when under the influence of the ambient forces, thus causing the pointer 112 to record the movement on the scale, so as to indicate the direction of the ambient magnetic forces.

In this embodiment a different transporting holding device is provided. Here a screw 115 is threadedly engaged in the wall 20 and at its inner end there is a bore 116 which receives a wire 118, the wire being secured in the bore by a screw 120. As shown in FIG. 5, the wire is in plan view extending horizontally, and disengaged from the magnet 110, having the shape of an "M" 122. When the screw 115 is rotated 90° so as to raise the "M" to a vertical position its nadir 124 will engage the magnet and hold it in position for transporting.

The device shown in FIG. 5 is similar to that shown in FIGS. 1-4 except for the addition of the iron bar 114 and the variation in the transporting configuration. When worked in the southerly direction, it will function in the same manner as described with reference to FIG. 4, except that the pointer need not be offset from the true north or the true south when it is worked in the respective northerly or southerly directions.

The invention and its attendant advantages will be understood from the foregoing description, and it will be apparent that various changes may be made in the form, construction and arrangement of the parts of the invention without departing from the spirit and scope thereof or sacrificing its material advantages, the arrangements hereinbefore described merely being by way of example. I do not wish to be restricted to the specific forms shown or uses mentioned, except as defined in the accompanying claims, wherein various portions have been separated for clarity of reading and not for emphasis.

I claim:

1. A terrestrial magnetism responsive device adapted to use a north or south seeking magnet in both north and south headings, comprising:
a housing having a pole seeking magnet thereon,
said magnet being suspended to be movable horizontally,
said magnet being suspended on a sensitive spring adajcent a non-seeking pole, said spring being supported in said housing,
said spring being a coil supported vertically at a lower end,
said magnet being attached to the other end of said spring so as to extend substantially horizontally therefrom.

2. In a terrestrial magnetism responsive device adapted to use a northwardly or southwardly seeking magnet in both generally north and south headings,
a support member,
a sensitive resilient member having one end secured to said support member,
a pole seeking magnet having a non-seeking pole thereof secured adjacent said last pole to said resilient member adjacent its other end,
said magnet extending substantially horizontally from said resilient member and being movable horizontally on said resilient member, said resilient member extending upwardly from said support member and its other end extending to support said magnet horizontally.

3. The invention according to claim 2, in which:
said resilient member is a coil spring.

4. In a terrestrial magnetism responsive device adapted to use a northwardly or southwardly seeking magnet in both generally north and south headings,
a support member,
a sensitive resilient member having one end secured to said support member,
a pole seeking magnet having a non-seeking pole thereof secured adjacent said last pole to said resilient member adjacent its other end,
said magnet extending substantially horizontally from said resilient member and being movable horizontally on said resilient member,
said magnet having a free northwardly seeking end supported adjacent its south pole.

5. The invention according to claim 4, in which:
said members and said magnet are contained within a housing.

6. The invention according to claim 5, including:
means in said housing to releasably hold said magnet in a fixed position for transporting.

7. The invention according to claim 6, including:
a compass attached to said housing and spaced therefrom sufficiently so as not to be influenced by the magnet in said housing.

8. The invention according to claim 7, in which:
said magnet is a rod having a pointer on its north seeking end adapted to point generally northerly when not influenced by local magnetic forces, and
a scale in said housing to measure movements of said pointer.

9. The invention according to claim 5, in which:
said housing is sealed,
said housing being insulated for temperature control, and
a centering bubble device for indicating when said housing is being held horizontally.

* * * * *